United States Patent [19]

Krikor

[11] Patent Number: 4,464,748

[45] Date of Patent: Aug. 7, 1984

[54] REMOTE DATA LINK SWITCHING ARRANGEMENT

[75] Inventor: Krikor A. Krikor, Glendale, Ariz.

[73] Assignee: GTE Automatic Electric Inc., Northlake, Ill.

[21] Appl. No.: 436,875

[22] Filed: Oct. 26, 1982

[51] Int. Cl.³ .............................................. H04J 3/12
[52] U.S. Cl. .................................... 370/58; 370/110.1
[58] Field of Search ............................... 370/110.1, 58

[56] References Cited

U.S. PATENT DOCUMENTS 4,403,322 9/1983 Kato et al. ....................... 370/110.1

Primary Examiner—Douglas W. Olms
Assistant Examiner—Kenneth I. Rokoff
Attorney, Agent, or Firm—Frank J. Bogacz; Peter Xiarhos

[57] ABSTRACT

An automated switching office arrangement for switching data link transmission from analog to digital data or vice versa is disclosed. Any or all of a number of data links may be automatically switched between the digital and the analog transmission modes. This automated switching may be accomplished locally within the switching office or from a remote location.

8 Claims, 2 Drawing Figures

U.S. Patent  Aug. 7, 1984  4,464,748
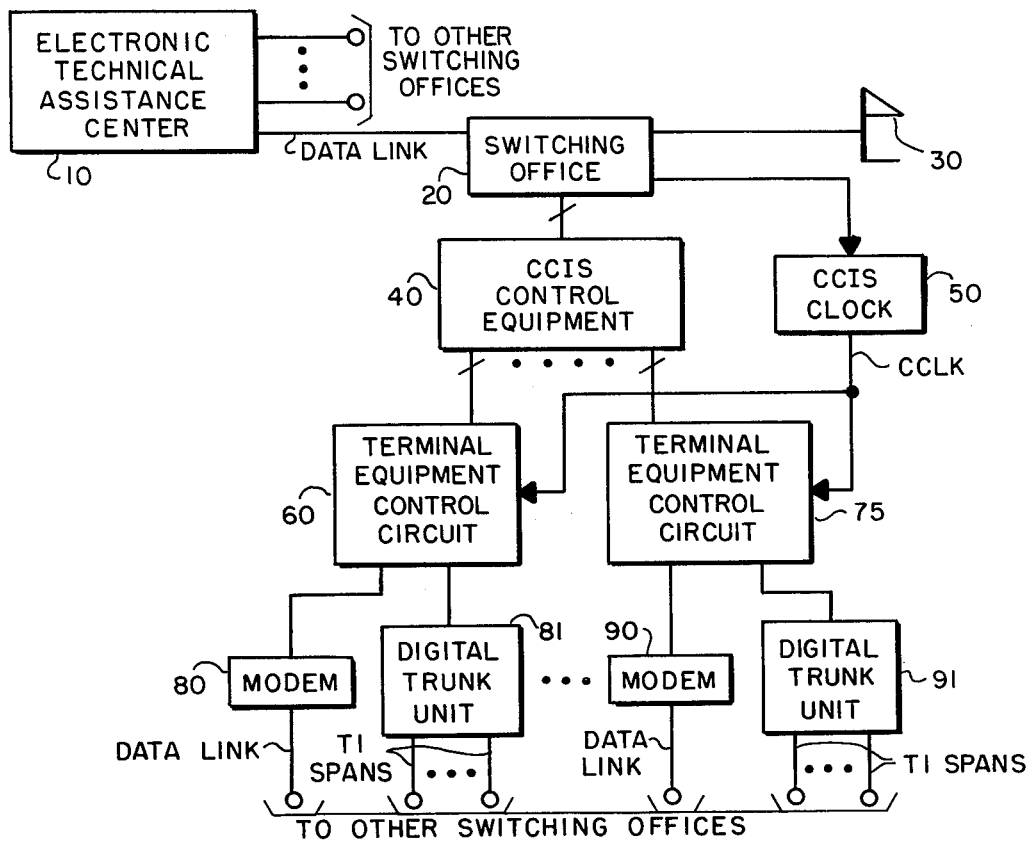
FIG. I
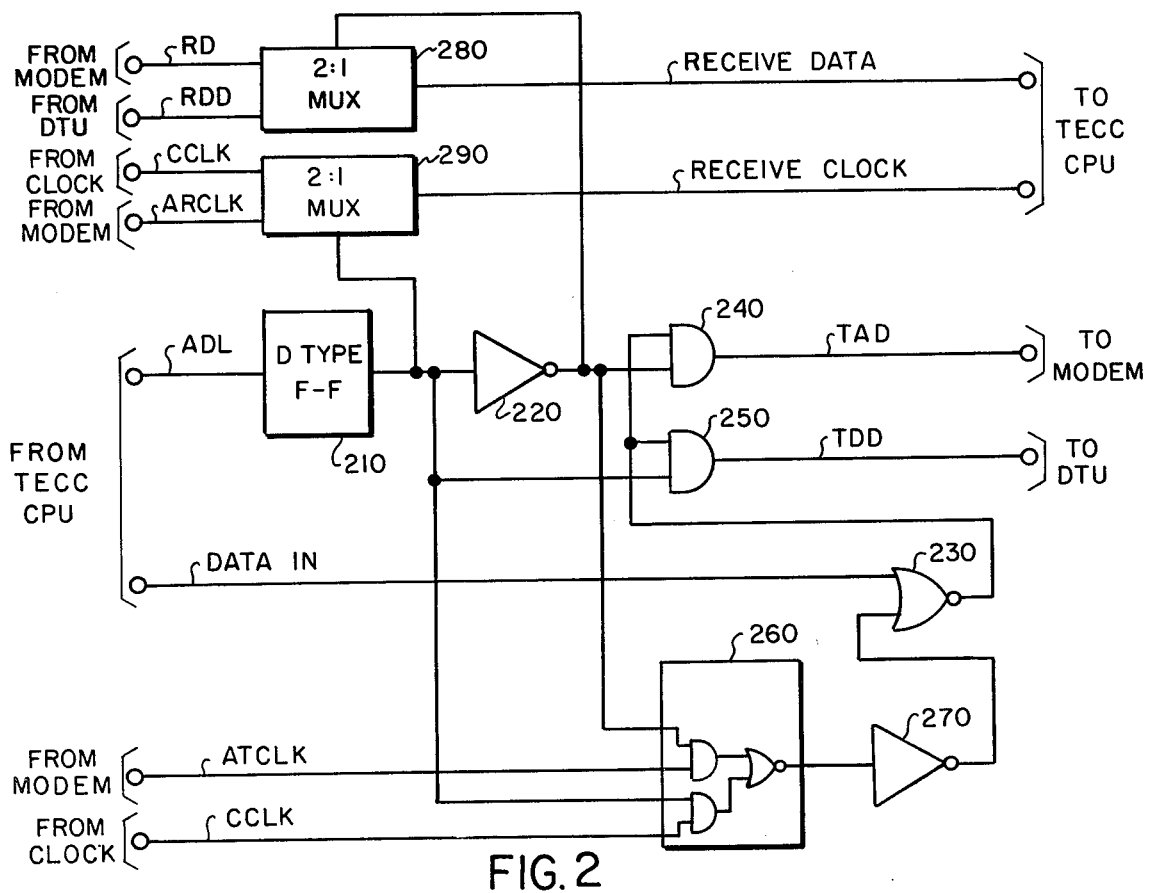
FIG. 2

REMOTE DATA LINK SWITCHING ARRANGEMENT

BACKGROUND OF THE INVENTION

The present invention pertains to analog and digital data transmission and more particularly to remotely controlled switching between analog and digital data link transmission of a switching office.

In modern electronic telephone switching systems, large volumes of data are transmitted from one switching office to other switching offices. This data is supervisory and signaling data, related to the processing of telephone calls. In order to accomplish this data transfer, data links operated by modems are connected between switching offices. The data links provide for rapidly transmitting the supervisory and signaling data between these switching offices. This data is transmitted via the modems in an analog manner. Analog data is information which is conveyed by the amplitude or phase of a signal.

More recently, switching offices employ digital data transmission techniques via T1 carrier equipment. Digital data is concerned with discrete states of a signal, such as the presence or absence of a voltage. Digital data may be transmitted at higher speeds than analog. At the present time, the telephone system is approximately 50% analog and 50% digital transmission. It is expected by the year 1990, that the telephone system will be nearly 100% digital data transmission. Therefore, a considerable change in equipment from analog to digital has and will yet occur.

It is expensive for maintenance personnel to install new equipment and re-wire existing analog equipment for conversion to digital equipment. In addition, during testing of digital or analog transmission equipment, many changes from analog to digital and back to analog may be necessary. To electrically wire these changes by hand each time is time consuming, expensive and requires lengthy service interruptions.

In electronic switching offices, it is desirable to perform maintenance functions from a remote location since, it is expensive to have maintenance personnel located at each electronic switching office. Many switching offices may be monitored by a single electronic maintenance and assistance center. Therefore, it is desirable to provide remote changeover from analog to digital data transmission and vice versa from this maintenance center.

Accordingly, it is an object of the present invention to provide an economical and automated remote or local data link switching arrangement.

SUMMARY OF THE INVENTION

A telephone switching system is interconnected with a number of switching offices, so that data is transferred between the switching offices in either the digital or analog mode. Switching apparatus is provided to change the mode of data transmission between any two switching offices from analog to digital or from digital to analog transmission. For each switching office, it is required that at least one analog terminal equipment (T1 span) and at least one analog terminal equipment (modem) be implemented for connecting the switching offices. Each of the modems produces an analog clock signal for receiving or transmitting the analog data. A clock connected to each switching office derives a digital clock signal from the digital switching network of the office. A digital trunk unit connects a number of T1 spans to the switching office for transferring digital data. A number of digital trunk units may be included in each switching office.

A device for generating a message, which indicates whether a change-over from analog to digital data transmission or vice versa is required, is connected to the switching office.

A control central processing unit (CPU) is connected to the switching office and provides for receiving and decoding the change-over message received by the switching office. A number of terminal equipment control circuits are each connected to the control CPU. Each terminal equipment control circuit is connected to a clock, to one particular digital trunk unit and to one particular modem.

Each terminal equipment control circuit includes an operating CPU connected to the control CPU. Each operating CPU receives and decodes the message transmitted to it from the control CPU. In addition, each operating CPU provides for the transmission of data to the modems or digital trunk units. A storage device is connected to the operating CPU. This storage device is set in response to the message received by the operating CPU to produce a steering signal of a first or a second value. One of these values represents digital data and the other value represents analog data.

A multiplexing arrangement is connected between the operating CPU, the modem and the digital trunk unit. A multiplexing apparatus is further connected to the storage device. The multiplexing apparatus operates to transmit either an analog clock signal and data or a digital clock signal and data to the operating CPU of the terminal equipment control circuit.

A first gating arrangement is connected to the operating CPU, to the modem and to digital trunk unit. This gating arrangement is further connected to the clock. The first gating arrangement is operated in response to the data of the operating CPU and to the first value of the steering signal to generate digital data. The first gating arrangement is also operated in response to the data of the operating CPU and second value of said steering signal to generate analog data.

Second gating apparatus is connected to the first gating arrangement, to the modem and digital trunk unit and to the storage device. The second gating apparatus is operated in response to the generated digital data of the first gating arrangement and the first value of the steering signal to transmit the digital data to the digital trunk unit. Alternatively, the second gating apparatus is operated in response to the generated analog data and to the second value of the steering signal to transmit the analog data to the modem.

DESCRIPTION OF THE DRAWINGS

FIG. 1 is a block diagram of an apparatus for switching between analog and digital data transmission in a telephone switching system.

FIG. 2 is a schematic diagram of the circuitry of a terminal equipment control circuit as shown in FIG. 1.

DESCRIPTION OF THE PREFERRED EMBODIMENT

Referring to FIG. 1, an electronic technical assistant center (ETAC) 10 is shown connected to a number of telephone switching offices. One particular switching office 20 is connected to the ETAC 10 via a data link.

This data link provides for the transmission of messages between the switching office 20 and ETAC 10. The ETAC 10 and switching office 20 may be located a great number of miles from one another.

A data terminal device 30 is also connected to switching office 20. Data terminal device 30 inputs messages to switching office 20 and is located within the proximity of switching office 20. Other input/output devices, such as tape units, may also be used. Switching office 20 also includes a central processing unit (CPU) and switching network not shown.

Switching office 20 is connected via a bus arrangement to common channel interoffice signaling (CCIS) control equipment 40. CCIS control equipment 40 may include a pair of Intel 8086 microprocessors, manufactured by the Intel Corporation, along with the associated memory. Intel is a registered trademark of the Intel Corporation. The CPU of the CCIS control equipment 40 provides for the reception of messages received by switching office 20. In addition, this CPU decodes change-over messages and distributes these decoded messages.

A number of terminal equipment control circuits (TECC) 60 through 75 are connected via bus arrangements to the CPU of CCIS control equipment 40. Each TECC is connected to a modem and a digital trunk unit. TECC 60 for example is connected to modem 80 and digital trunk unit 81. Modems 90, etc. are connected via data links to other switching offices. Digital trunk units 81 and 91 shown are connected via T1 spans to other switching offices for digital transmission.

CCIS clock 50 is connected to the switching network of the switching office 20. Clock 50 provides for deriving the proper frequency for digital CCIS data transmission. Clock 50 is also connected to each of the terminal equipment control circuits 60 through 75 for the transmission of the derived clock signal to the TECC.

A message, indicating that terminal equipment control circuit 60, for example, is to change its mode of data transmission from analog, via modem 80, to digital, via digital trunk unit 81, is input from either ETAC 10 or data terminal 30 to switching office 20. Switching office 20 examines this message and determines that the message is to be transmitted to the CPU of the CCIS control equipment 40. The CPU of CCIS control equipment 40 then determines whether the message requests an action of a particular TECC, such as TECC 60. The CPU of the CCIS control equipment 40 transmits this message to TECC 60.

A sample of the actual message transmitted via the data terminal 30 or ETAC 10 might read: "change link number X to digital" or "change link number X to analog". The X indicates the identity of the particular TECC to which this message is to be transmitted. The first example indicates that a change-over of data transmission is to occur from analog to digital and a second example message indicates that a change-over is to occur from digital to analog.

Each TECC 60-75 may include an Intel 8085 microprocessor CPU (not shown). The CPU of TECC 60 is connected to modem 80 and to digital trunk unit 81.

TECC 60 will continue to be used as an example of the TECC operation. Referring to FIG. 2, the CPU of TECC 60 is connected via an associated bus structure to D-type flip-flop 210. Flip-flop 210 is connected via the ADL lead to inverter 220. A logic "0" on the ADL lead indicates that the TECC is to operate in the analog mode whereas, a logic "1" indicates the digital mode.

The output of flip-flop 210 is also connected to 2 to 1 multiplexer 290, AND gate 250 and to one input of the AND-NOR gate 260. Inverter 220 is connected to 2 to 1 multiplexer 280, AND gate 240 and to another input of the AND-NOR gate 260.

AND-NOR gate 260 is also connected to a corresponding modem via the ATCLK lead and to the derived clock via the CCLK lead and provides for gating one of these clock signals in order to transmit data at the appropriate rate to the modem or digital trunk unit. The output signal of AND-NOR gate 260 is transmitted to NOR gate 230 ia a serial connection of inverter 270 to NOR gate 230. NOR gate 230 is also connected to the CPU of TECC 60 and provides for clocking the DATA IN signal with the appropriate clock signal, either ATCLK for modem or CCLK for digital trunk unit, to produce data at the proper rate.

The send data SD led connects NOR gate 230 to both AND gates 240 and 250. AND gate 240 is connected to its corresponding modem via the TAD lead for analog data transmission. AND gate 250 is connected to a digital trunk unit via the TDD lead for digital data transmission. Gates 240 and 250 operate as a function of the ADL signal. Either gate 240 or 250 operates to transmit data to its corresponding device, depending upon the state of flip-flop 210 as outlined above. The above arrangement provides for data transmission from the CPU of TECC 60 to either a corresponding modem or digital trunk unit and T1 span to another switching office.

For data transmitted from either the digital trunk unit or the modem to the CPU of a TECC, a multiplexing operation is performed. Multiplexer 290 is connected to the clock shown in FIG. 1 via the CCLK lead. Multiplexer 290 is also connected to a corresponding modem, shown in FIG. 1, via the analog receive clock ARCLK lead which provides for transmission of an analog receive clock signal. Multiplexer 290 is operated in response to flip-flop 210 via the ADL lead to transmit either the analog clock signal ARCLK or the digital clock signal CCLK to the CPU of TECC 60 via the RECEIVE CLOCK lead connecting multiplexer 290 to this CPU.

Multiplexer 280 is connected to a digital trunk unit and to a modem via the RDD and RD leads, respectively. The RD provides for the transmission of analog data from the modem to the TECC CPU. The RDD lead provides for transmission of digital data from the digital trunk unit to the CPU. Similarly, the RD lead provides for analog data transmission. Multiplexer 280 is operated in response to inverter 220 to transmit either the digital data from the RDD lead or the analog data from the RD lead to the CPU via the RECEIVE DATA lead.

Switching between transmission and reception of digital or analog data is accomplished by the manipulation of flip-flop 210 by each TECC's CPU to indicate analog or digital data transmission, in response to the message received from either the ETAC or the data terminal. This switching is automatically accomplished and requires no manual re-wiring of data transmission facilities.

AND-NOR gate 260 may be implemented with an integrated circuit part no. 74LS51 such as that manufactured by the Texas Instruments Corporation, as described in the Texas Instruments Data Book.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telephone switching system having a plurality of switching offices interconnected to transmit digital and analog data between said switching offices, apparatus for switching between said transmitted analog data and said transmitted digital data, said apparatus comprising:

said plurality of switching offices including at least a first and a second switching office;

a plurality of T1 spans, one particular T1 span connected between said first and second switching offices;

a plurality of modems, one particular modem connected between said first and second offices, each said modem operated to produce an analog clock signal;

a digital trunk unit connected to at least one of said plurality of T1 spans and each said digital trunk unit operated to transfer said digital data between said first switching office and said connected ones of said plurality of T1 spans;

a first CPU connected to said first switching office and operated to receive and examine messages from said first switching office;

a clock connected to said first switching office and operated to produce a digital clock signal;

means for requesting connected to said first switching office and operated to produce a message indicating whether digital or analog data is to be transmitted between said first and second switching offices;

a plurality of terminal equipment control circuits, each terminal equipment control circuit connected to said first CPU, to said clock, to said one digital trunk unit and to said one modem;

each terminal equipment control circuit comprising:

a second CPU connected to said first CPU and operated to receive said received message from said first CPU;

said second CPU further operated to send data to and receive data from said connected modem and said digital trunk unit;

means for storing connected to said second CPU for indicating whether analog or digital data is to be transmitted between said second switching office and said terminal equipment control circuit, said means for storing operated in response to said second CPU to produce a steering signal of a first value for analog data transmission or to produce a steering signal of a second value for digital data transmission;

multiplexing means connected between said second CPU, said modem, said digital trunk unit and said means for storing, said multiplexing means operated in response to said first value of said steering signal to transmit said analog data and said analog clock signal from said connected modem to said second CPU or alternatively operated in response to second value of said steering signal to transmit said digital data and said digital clock signal from said digital trunk unit to said second CPU;

first gating means connected to said second CPU, to said modem, to said digital trunk unit and to said clock, said first gating means operated in response to said means for storing and to said sent data of said second CPU to produce digital data in response to said steering signal of said first value or to produce analog data in response to said steering signal of said second value; and second gating means connected to said first gating means, to said modem, to said digital trunk unit and to said means for storing and said second gating means operated to transmit said produced digital data to said digital trunk unit in response to said steering signal of said second value or said second gating means operated to transmit said produced analog data to said modem in response to said steering signal of a first value.

2. Apparatus as claimed in claim 1, said means for requesting including:

at least one data link;

a remotely located data processing system connected to said first switching office via said one data link, said data processing system operated to transmit messages to said first switching office for switching said transmitted data from analog to digital or from digital to analog.

3. Apparatus as claimed in claim 1, wherein said means for requesting includes an input/output device connected to said first switching office.

4. Apparatus as claimed in claim 3, wherein said input/output device includes a data terminal connected to said first switching office.

5. Apparatus as claimed in claim 1, said means for storing including:

a flip-flop connected to said second CPU, to said multiplexing means and to said first and said second gating means and said flip-flop operated to produce said steering signal of said first value; and an inverter connected to said flip-flop, to said multiplexing means and to said first and second gating means and said inverter operated in response to said steering signal of said first value to produce said steering signal of said second value.

6. Apparatus as claimed in claim 5, wherein said first gating means includes a two wide, two input AND-NOR gate connected to said modem, to said flip-flop, to said inverter and to said clock.

7. Apparatus as claimed in claim 6, wherein said first gating means further includes a NOR gate connected to said second CPU and to said AND-NOR gate, said NOR gate operated to combine said transmit data of said second CPU with said digital clock signal or with said analog clock signal to produce digital data or to produce analog data, respectively.

8. Apparatus as claimed in claim 7, said second gating means including:

a first AND gate connected to said inverter, to said NOR gate and to said modem for transmitting said analog data to said modem; and a second AND gate connected to said flip-flop, to said NOR gate and to said digital trunk unit for transmitting said digital data to said digital trunk unit.

* * * * *